United States Patent
Chen et al.

(10) Patent No.: US 9,966,833 B2
(45) Date of Patent: May 8, 2018

(54) SWITCHING REGULATOR CAPABLE OF REDUCING CURRENT RIPPLE AND CONTROL CIRCUIT THEREOF

(71) Applicant: RICHTEK TECHNOLOGY CORPORATION, Zhubei, HsinChu (TW)

(72) Inventors: Chien-Yang Chen, Taipei (TW); Ta-Yung Yang, Taoyuan (TW); Yu-Wen Chang, Nantou (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days. days.

(21) Appl. No.: 15/489,479

(22) Filed: Apr. 17, 2017

(65) Prior Publication Data

US 2017/0353102 A1  Dec. 7, 2017

Related U.S. Application Data

(60) Provisional application No. 62/346,716, filed on Jun. 7, 2016.

(30) Foreign Application Priority Data

Jan. 23, 2017 (CN) .......................... 2017 1 0062401

(51) Int. Cl.
*H02M 1/15* (2006.01)
*H02M 7/06* (2006.01)
*H02M 1/32* (2007.01)
*H05B 33/08* (2006.01)

(52) U.S. Cl.
CPC ............... *H02M 1/15* (2013.01); *H02M 1/32* (2013.01); *H02M 7/06* (2013.01); *H05B 33/0809* (2013.01); *H05B 33/089* (2013.01); *H05B 33/0815* (2013.01)

(58) Field of Classification Search
CPC ........................... H02M 1/15; H05B 33/0809
See application file for complete search history.

(56) References Cited

U.S. PATENT DOCUMENTS

| 8,742,674 B2 * | 6/2014 | Shteynberg | H05B 33/0815 315/201 |
| 9,288,855 B2 * | 3/2016 | Fan | H05B 33/0815 |
| 2014/0062333 A1 * | 3/2014 | Sonobe | H05B 33/0815 315/291 |

* cited by examiner

*Primary Examiner* — Douglas W Owens
*Assistant Examiner* — Pedro C Fernandez
(74) *Attorney, Agent, or Firm* — Tung & Associates

(57) ABSTRACT

The present invention discloses a switching regulator capable of reducing current ripple and a control circuit thereof. The switching regulator includes a buck power stage circuit and a control circuit. The control circuit includes an operation signal generation circuit and a current source circuit for reducing current ripple. The current source circuit is coupled to the operation signal generation circuit and the buck power stage circuit, for operating a ripple reduction switch therein according to an operation signal, to convert the output voltage to a load voltage between a load node and a reference node, and to reduce a current ripple of the output current, so as to generate a load current which is supplied to a load circuit, wherein the load circuit is coupled between the load node and the reference node, and the current source circuit is coupled between the output node and the load node.

20 Claims, 4 Drawing Sheets

D1 can be replaced by:

SWITCHING REGULATOR CAPABLE OF REDUCING CURRENT RIPPLE AND CONTROL CIRCUIT THEREOF

CROSS REFERENCE

The present invention claims priority to U.S. 62/346,716, filed on Jun. 7, 2016, and CN 201710062401.3, filed on Jan. 23, 2017.

BACKGROUND OF THE INVENTION

Field of Invention

The present invention relates to a switching regulator capable of reducing current ripple and a control circuit thereof; particularly, it relates to such a switching regulator which has power factor correction (PFC) function and is capable of reducing current ripple at its load side, and a control circuit thereof.

Description of Related Art

FIG. 1 shows a schematic diagram of a light emitting diode (LED) power supply circuit 100, for generating an output voltage Vout and an output current Iout, and providing a light emitting device current ILED to an LED circuit 20, wherein the output voltage Vout has a signal waveform which is indicated by a small signal waveform shown in the figure. As shown in FIG. 1, a rectifier circuit 30 receives an AC voltage which is generated by an AC power source 40, and the rectifier circuit 30 rectifies the AC voltage to generate the output voltage Vout and the output current Iout. An output capacitor Cout is connected to the rectifier circuit 30 to filter the output voltage Vout so as to provide a light emitting device current ILED to the LED circuit 20.

For improving the power factor, the rectifier circuit 30 typically includes a PFC circuit (not shown), which causes the output current Iout (and consequently the light emitting device current ILED) to carry a current ripple with a frequency twice the AC voltage. For example, if the AC voltage has a frequency of 50 Hz or 60 Hz, the current ripple of the output current Iout has a frequency of 100 Hz or 120 Hz, in a low frequency range. Typical component used as the output capacitor Cout is not capable of filtering out the current ripple with such a low frequency. Therefore, the light emitting device current ILED flowing through the LED circuit 20 also has a current ripple with the same frequency, causing the LED circuit 20 to flicker slightly. The flicker might not be perceptible by human eyes, but an electronic device such as a camera or a video recorder can perceive the flicker, resulting in a rippled image displayed on a screen thereof.

In view of above, the present invention proposes a switching regulator and a control circuit thereof, which reduce the current ripple of the output current to provide a stable load current to a load circuit.

SUMMARY OF THE INVENTION

From one perspective, the present invention provides a switching regulator capable of reducing current ripple, comprising: a buck power stage circuit, which is configured to operably control at least one power switch therein according to a first operation signal, so as to convert a rectified voltage to an output voltage between an output node and a first reference node, and to generate an output current; and a control circuit, including: an operation signal generation circuit, which is coupled to the buck power stage circuit, the operation signal generation circuit being configured to operably generate the first operation signal according to a first current sense signal or a voltage sense signal, wherein the first current sense signal is related to the output current, and the voltage sense signal is related to the output voltage, and the operation signal generation circuit being configured to operably generate a second operation signal according to a second current sense signal; and a current source circuit for reducing current ripple, which is coupled to the operation signal generation circuit and the buck power stage circuit, and is configured to operably control a ripple reduction switch therein according to the second operation signal, to convert the output voltage to a load voltage between a load node and the first reference node, and to reduce a current ripple of the output current, so as to generate a load current for supplying to a load circuit; wherein the load circuit is coupled between the load node and the first reference node, and the current source circuit is coupled between the output node and the load node, wherein the second current sense signal is related to the load current.

From another perspective, the present invention provides a control circuit of a switching regulator capable of reducing current ripple, wherein the switching regulator includes a buck power stage circuit, which is configured to operably control at least one power switch therein according to a first operation signal, so as to convert a rectified voltage to an output voltage between an output node and a first reference node, and to generate an output current; the control circuit comprising: an operation signal generation circuit, which is coupled to the buck power stage circuit, the operation signal generation circuit being configured to operably generate the first operation signal according to a first current sense signal or a voltage sense signal, wherein the first current sense signal is related to the output current, and the voltage sense signal is related to the output voltage, and the operation signal generation circuit being configured to operably generate a second operation signal according to a second current sense signal; and a current source circuit for reducing current ripple, which is coupled to the operation signal generation circuit and the buck power stage circuit, and is configured to operably control a ripple reduction switch therein according to the second operation signal, to convert the output voltage to a load voltage between a load node and the first reference node, and to reduce a current ripple of the output current, so as to generate a load current for supplying to a load circuit; wherein the load circuit is coupled between the load node and the first reference node, and the current source circuit is coupled between the output node and the load node, wherein the second current sense signal is related to the load current.

In one preferable embodiment, the buck power stage circuit includes: the power switch, which is coupled between the operation signal generation circuit and the output node, and is configured to operably control according to the first operation signal, so as to convert the rectified voltage to the output voltage between the output node and the first reference node, and to generate the output current; a diode or a switch, which is coupled between the output node and a second reference node, wherein the diode has a forward terminal and a reverse terminal, wherein the reverse terminal is electrically connected to the output node, and the forward terminal is electrically connected to the second reference node; and an inductor, which is coupled between the first reference node and the second reference node.

In one preferable embodiment, the buck power stage circuit further includes a first capacitor, which is coupled between the output node and the first reference node.

In one preferable embodiment, the operation signal generation circuit and the current source circuit are integrated in an integrated circuit (IC) chip.

In one preferable embodiment, the operation signal generation circuit generates the first operation signal according to the voltage sense signal, so as to regulate the output voltage, and generates the second operation signal according to the second current sense signal, such that the current source circuit regulates the load current.

In one preferable embodiment, the switching regulator further includes a first current sense circuit, which is coupled between the output node and the load node, and which is configured to operably generate the first current sense signal according to the output current.

In the one preferable embodiment, the switching regulator further includes an over voltage protection (OVP) detection circuit, which is coupled between the operation signal generation circuit and the first reference node, and which is configured to operably provide an OVP signal to the operation signal generation circuit, wherein the operation signal generation circuit generates the first operation signal further according to the OVP signal, so as to trigger an OVP procedure when the OVP signal exceeds an over voltage threshold.

In one preferable embodiment, the operation signal generation circuit triggers an over current protection (OCP) procedure when the first current sense signal exceeds an over current threshold.

In one preferable embodiment, the load circuit includes a light emitting device circuit.

In one preferable embodiment, the operation signal generation circuit generates the first operation signal according to the first current sense signal, so as to regulate the output current, and generates the second operation signal according to a ripple signal of the second current sense signal, such that the current source circuit reduces the current ripple.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
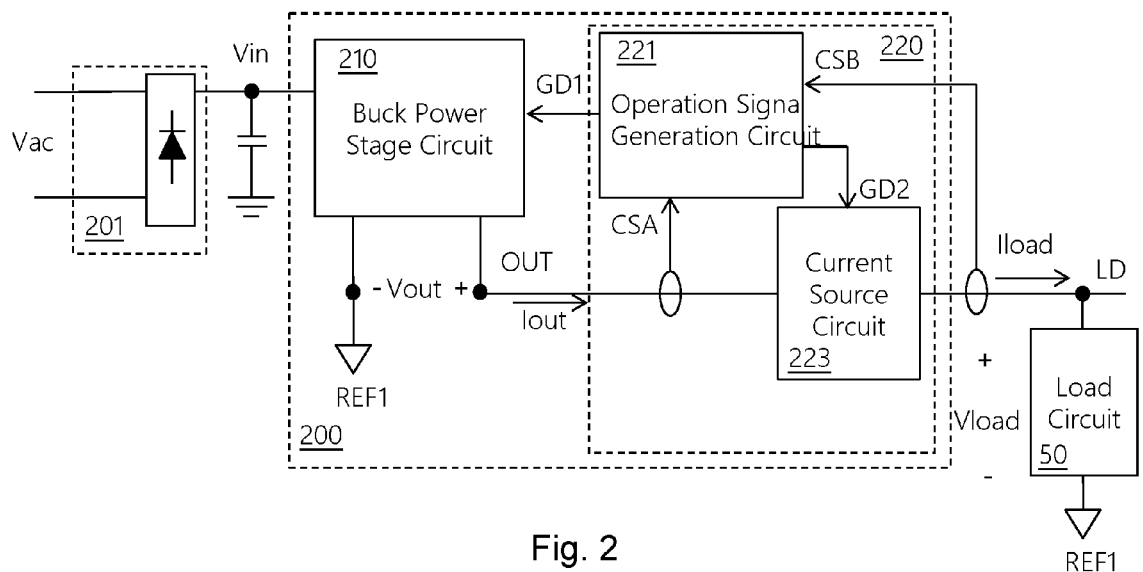
FIG. 2 show a first embodiment of the present invention.

Please refer to FIG. 2 for a first embodiment according to the present invention. As shown in FIG. 2, a rectifier circuit 201 rectifies an AC voltage Vac to generate a rectified voltage Vin. The rectifier circuit 201 is for example but not limited to a bridge rectifier circuit. The signal waveforms of the AC voltage Vac and the rectified voltage Vin are schematically illutsrated in FIG. 3. A switching regulator 200 according to the present invention, which is capable of reducing current ripple, includes a buck power stage circuit 210 and a control circuit 220. The control circuit 220 includes an operation signal generation circuit 221 and a current source circuit 223 for reducing current ripple. The buck power stage circuit 210 controls at least one power switch therein according to an operation signal GD1, so as to convert the rectified voltage Vin to an output voltage Vout between an output node OUT and a first reference node REF1, and to generate an output current Iout. The operation signal generation circuit 221 is coupled to the buck power stage circuit 210. The operation signal generation circuit 221 generates the operation signal GD1 according to a current sense signal CSA. The current sense signal CSA is related to the output current Iout. The operation signal generation circuit 221 also generates an operation signal GD2 according to a current sense signal CSB which is related to a load current Iload. The current source circuit 223 for reducing current ripple is coupled to the operation signal generation circuit 221 and the buck power stage circuit 210. The current source circuit 223 operates a ripple reduction switch (not shown in FIG. 2, will be described in detail later) therein according to the operation signal GD2, to convert the output voltage Vout to a load voltage Vload between a load node LD and the first reference node REF1, and to reduce a current ripple of the output current Iout, so as to generate the load current Iload which is supplied to a load circuit 50. The load circuit 50 is coupled between the load node LD and the first reference node REF1, and the current source circuit 223 is coupled between the output node OUT and the load node LD.

In this embodiment, a single-stage power stage circuit with PFC function is adopted to convert the rectified voltage Vin to the output voltage Vout; that is, the buck power stage circuit 210 is not a two-stage circuit which include two power stages, in which a first stage includes power switches to convert the rectified voltage Vin to an intermediate voltage, and a second stage includes power switches to convert the intermediate voltage to the output voltage Vout. Such single-stage power stage circuit with PFC function typically has a high output current ripple problem, but the present invention can reduce the current ripple of the output current Iout to provide a better quality load current Iload to the load circuit 50 with much less current ripple. On the other hand, in the prior art, the current flowing through the load circuit is unstable because of the current ripple, and when the load circuit is a light emitting device circuit, the light emitting device circuit will flicker which is undesired.

Figure 3:
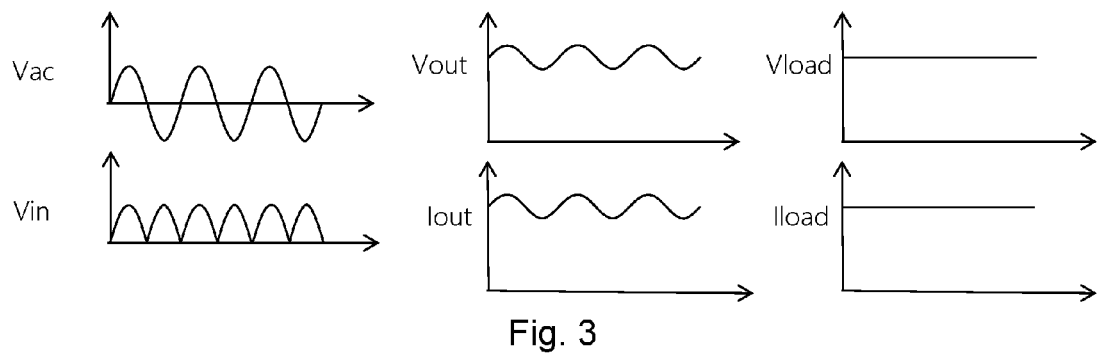
FIG. 3 shows signal waveforms according to the present invention.

FIG. 3 schematically illustrates signal waveforms according to the present invention. As shown in FIG. 3, the AC voltage Vac has a sinusoidal waveform. The AC voltage is rectified and converted to the rectified voltage Vin, wherein the rectified voltage Vin is full-wave rectified to have a semi-sinusoidal waveform. The buck power stage circuit 210 converts the rectified voltage Vin having the semi-sinusoidal waveform to the output voltage Vout, but the output voltage Vout carries a voltage ripple, as shown. And because of the PFC function, the output current Iout follows the waveform of the output voltage Vout, so the output current Iout also carries a current ripple. Although PFC increases the power utilization efficiency, the ripple is undesired. According to the present invention, the current source circuit 223 converts the output voltage Vout to the stable load voltage Vload between the load node LD and the first reference node REF1, and reduces the current ripple of the output current Iout so as to generate the stable load current Iload which is supplied to the load circuit 50. The operation signal generation circuit 221 generates the operation signal GD1 according to the current sense signal CSA to regulate the output current Iout, and generates the operation signal GD2 according to a ripple signal of the current sense signal CSB, such that the current source circuit 223 reduces the current ripple. "Ripple signal of the current sense signal CSB" means any signal that can be derived from the current sense signal CSB to indicate its ripple, such as but not limited to its peak, valley, peak-to-peak interval, valley-to-valley interval, peak-to-valley difference, peak-to-average difference, average-to-valley difference, etc.

Figure 4:
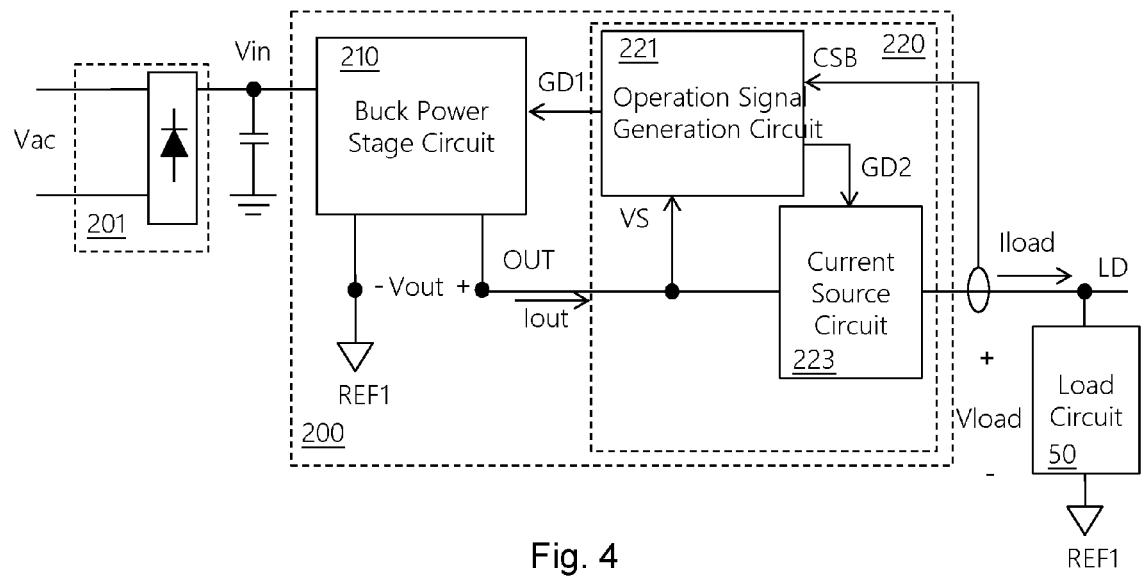
FIG. 4 shows a second embodiment of the present invention.

FIG. 4 shows a second embodiment of the present invention. This embodiment is different from the first embodiment in that, as shown in FIG. 4, the operation signal generation circuit 221 generates the operation signal GD1 according to a voltage sense signal VS (instead of the current sense signal CSA) to regulate the output voltage Vout (instead of the output current Iout), and generates the operation signal GD2 according to the current sense signal CSB (instead of the ripple signal of the current sense signal CSB), such that the current source circuit 223 regulates the load current Iload. Mechanisms of regulating voltage or regulating current, according to the current sense signal or according to ripple signal of the current sense signal, are different; accordingly, corresponding circuitry designs are different. One skilled in this art can design the detailed circuitry in light of the present invention depending on the different mechanisms.

Figure 5:
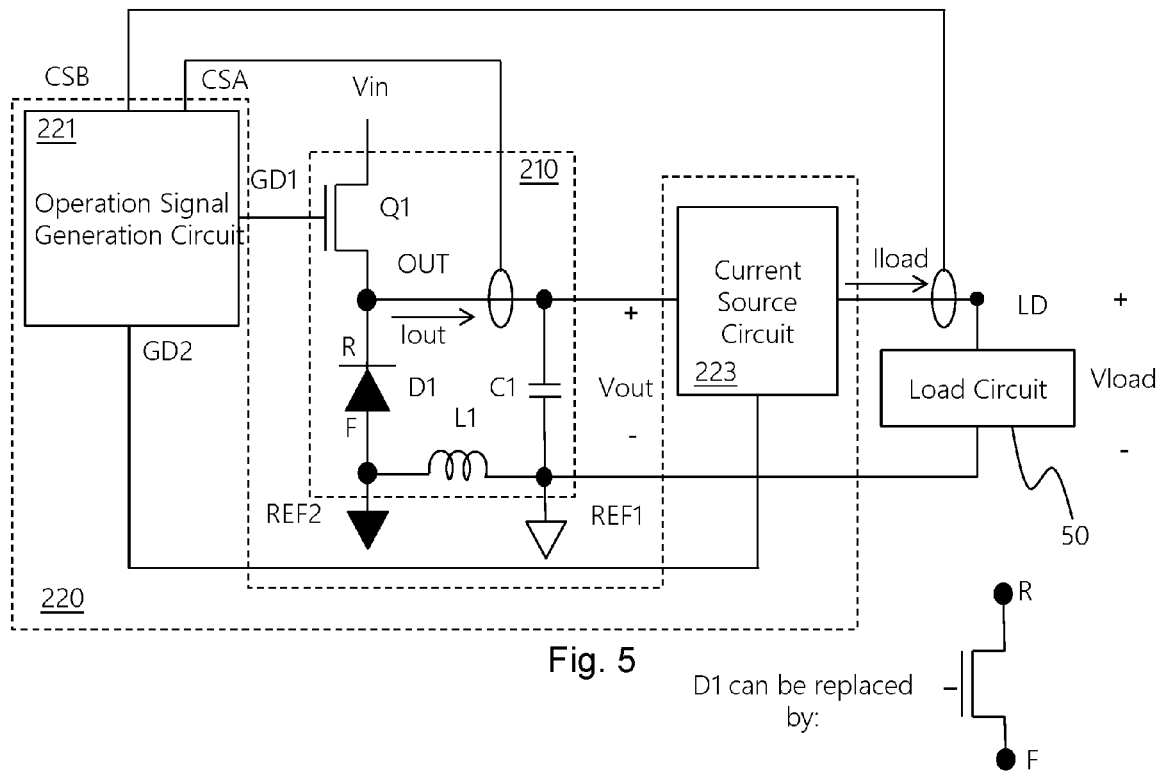
FIG. 5 shows a third embodiment of the present invention.

FIG. 5 shows a third embodiment of the present invention. This embodiment shows a more specific embodiment of the buck power stage circuit 210. As shown in the figure, the buck power stage circuit 210 is a single-stage power stage circuit, which includes: a power switch Q1, a diode D1, an inductor L1, and a capacitor C1. The power switch Q1 is coupled between the operation signal generation circuit 221 and the output node OUT, and it operates according to the operation signal GD1, to convert the rectified voltage Vin to the output voltage Vout (wherein the output voltage Vout is a voltage drop between the output node OUT and the first reference node REF1), and to generate the output current Iout. The diode D1 is coupled between the output node OUT and the second reference node REF2. The diode D1 has a forward terminal F and a reverse terminal R, wherein the reverse terminal R is electrically connected to the output node OUT, and the forward terminal F is electrically connected to the second reference node REF2. The inductor L1 is coupled between the first reference node REF1 and the second reference node REF2. The capacitor C1 is connected between the output node OUT and the first reference node REF1. Note that, the diode D1 can be replaced by a switch, which has a current outflow terminal electrically connected to the output node OUT, a current inflow terminal electrically connected to the second reference node REF2, and a control terminal controlled by the operation signal generation circuit 221.

Figure 1:
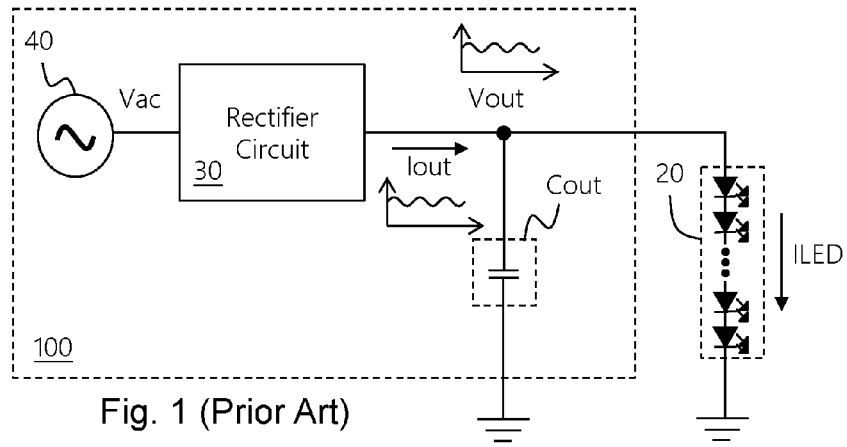
FIG. 1 shows a schematic diagram of a prior art light emitting diode (LED) power supply circuit 100 with power factor correction (PFC) function.

In general, a buck power stage circuit, compared to a boost power stage circuit or a buck-boost power stage circuit, has a higher power conversion efficiency, because all the current generated through the buck power stage will be provided to the output node, while some portion of the current generated through the boost power stage will flow to ground and is wasted. Note that the power switch Q1, the diode D1, the inductor L1, and the capacitor C1 in the buck power stage circuit 210 according to this embodiment are arranged in a way different from a typical connection of a conventional buck power stage circuit (not shown). One difference between the arrangement of the present invention and the conventional arrangement is that the inductor L1 is not directly connected to the node between the power switch Q1 and the diode D1; the inductor L1 is not connected between this node and the positive end of the output voltage Vout. Instead, the inductor L1 is connected between the second reference node REF2 and the negative end of the output voltage Vout. By this arrangement, when the buck power stage circuit 210 drives a directional load circuit, such as the LED circuit 20 shown in FIG. 1, a forward terminal of the directional load circuit (such as the forward terminal of the LED circuit 20) will be at a voltage level which is acceptable by an integrated circuit (IC), and therefore, the forward terminal of the directional load circuit can be directly connected to (or connected via a passive circuit such as a resistive circuit, to) the control circuit 220, such that the control circuit 220 can be integrated in a single IC chip, i.e., the operation signal generation circuit 221 and the current source circuit 223 of the control circuit 220 can be integrated in one single IC chip. If the buck power stage circuit is arranged according to the conventional way, wherein the inductor L1 is directly connected between the node between the power switch Q1 and the diode D1 and the positive end of the output voltage Vout, then it would be difficult to integrate the current source circuit 223 into the same IC as the operation signal generation circuit 221.

Figure 6:
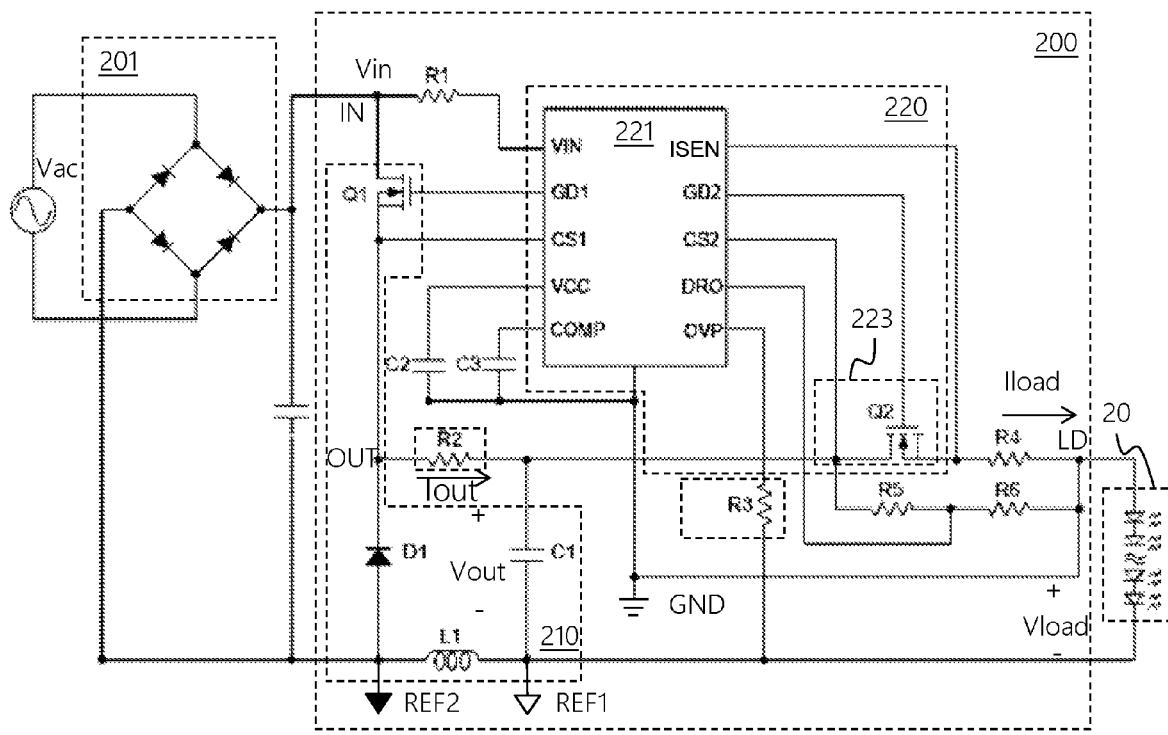
FIG. 6 shows a fourth embodiment of the present invention.

FIG. 6 shows a fourth embodiment of the present invention. As shown in FIG. 6, the rectifier circuit 201 rectifies the AC voltage Vac to generate the rectified voltage Vin between the input node IN and the ground level GND. The rectifier circuit 201 is for example but not limited to a bridge rectifier circuit as shown in the figure. The switching regulator 200 capable of reducing current ripple includes the buck power stage circuit 210, the control circuit 220, capacitors C2 and C3, and resistors R1, R2, R3, R4, R5, and R6. The control circuit 220 includes the operation signal generation circuit 221 and the current source circuit 223 for reducing current ripple. The buck power stage circuit 210 operates the power switch Q1 therein according to the operation signal GD1, so as to convert the rectified voltage Vin to the output voltage Vout between the output node OUT and the first reference node REF1 (wherein the voltage drop across the resistor R2 may be ignored), and to generate the output current Iout. The operation signal generation circuit 221 is coupled to the buck power stage circuit 210. The operation signal generation circuit 221 generates the operation signal GD1 according to the current sense signal CSA. The current sense signal CSA is related to the output current Iout. As shown in the figure, for example, the current sense signal CSA may be generated by sensing a voltage drop between the pins CS1 and CS2, which indicates the output current Iout flowing through the resistor R2. The operation signal generation circuit 221 also generates the operation signal GD2 according to the current sense signal CSB. The current sense signal CSB is related to the load current Iload. For example, as shown in the figure, the current sense signal CSB may be generated by electrically connecting the pin ISEN to the resistor R4. The current source circuit 223 for reducing current ripple is coupled to the operation signal generation circuit 221 and the buck power stage circuit 210. The current source circuit 223 includes a ripple reduction switch Q2 which operates according to the operation signal GD2, to convert the output voltage Vout to the load voltage Vload between the load node LD and the first reference node REF1, and to reduce the current ripple of the output current Iout, so as to generate the stable load current Iload which is supplied to the load circuit 50. The load circuit 50 is coupled between the load node LD and the first reference node REF1, and the current source circuit 223 is coupled between the output node OUT and the load node LD. In addition, the resistors R5 and R6 form a voltage divider circuit. The divided voltage at the node between the resistors R5 and R6 is inputted to the pin DRO. This is to obtain information of the drain voltage of the ripple reduction switch Q2. As such, when the ripple reduction switch Q2 is located outside the IC chip which includes the operation signal generation circuit 221, the operation point of the ripple reduction switch Q2 may be adjusted by adjusting the resistances of the resistors R5 and R6.

The current source circuit 223 for reducing current ripple is coupled to the operation signal generation circuit 221 and the buck power stage circuit 210, and the current source circuit 223 operates the ripple reduction switch Q2 therein according to the operation signal GD2, to convert the output voltage Vout to the load voltage Vload between the load node LD and the first reference node REF1, and to reduce the current ripple of the output current Iout, so as to generate a stable load current Iload which is supplied to the load circuit 50, wherein the load circuit 50 in this embodiment is for example but not limited to the LED circuit 20. The LED circuit 20 is coupled between the load node LD and the first reference node REF1, and the current source circuit 223 is coupled between the output node OUT and the load node LD.

In this embodiment, the IC chip has a pin VIN which is coupled to the input voltage Vin, for providing electrical power to the IC chip which includes the operation signal generation circuit 221, and a pin VCC which is coupled to the capacitor C2, for regulating an internal supply voltage inside the IC chip. Preferably, the switching regulator 200 includes an over voltage protection (OVP) detection circuit, which is coupled between the operation signal generation circuit 221 and the first reference node REF1. The OVP detection circuit in this embodiment includes for example but not limited to the resistor R3 as shown in the figure. The OVP detection circuit provides an OVP signal to a pin OVP of the IC chip which includes the operation signal generation circuit 221. The operation signal generation circuit 221 generates the first operation signal GD1 further according to the OVP signal (in addition to the current sense signal CSA), so as to trigger an OVP procedure when the OVP signal exceeds an over voltage threshold. The switching regulator 200 preferably further includes an over current protection (OCP) detection circuit, which is coupled between pins CS1 and CS2 of the IC chip which includes the operation signal generation circuit 221. The OCP detection circuit in this embodiment includes for example but not limited to the resistor R2 as shown in the figure. The OCP detection circuit provides an OCP signal to the IC chip including the operation signal generation circuit 221. The operation signal generation circuit 221 generates the first operation signal GD1 according to the OCP signal (in one embodiment, the current sense signal CSA is the OVP signal), so as to trigger an OCP procedure when the OCP signal exceeds an over current threshold.

Figure 7:
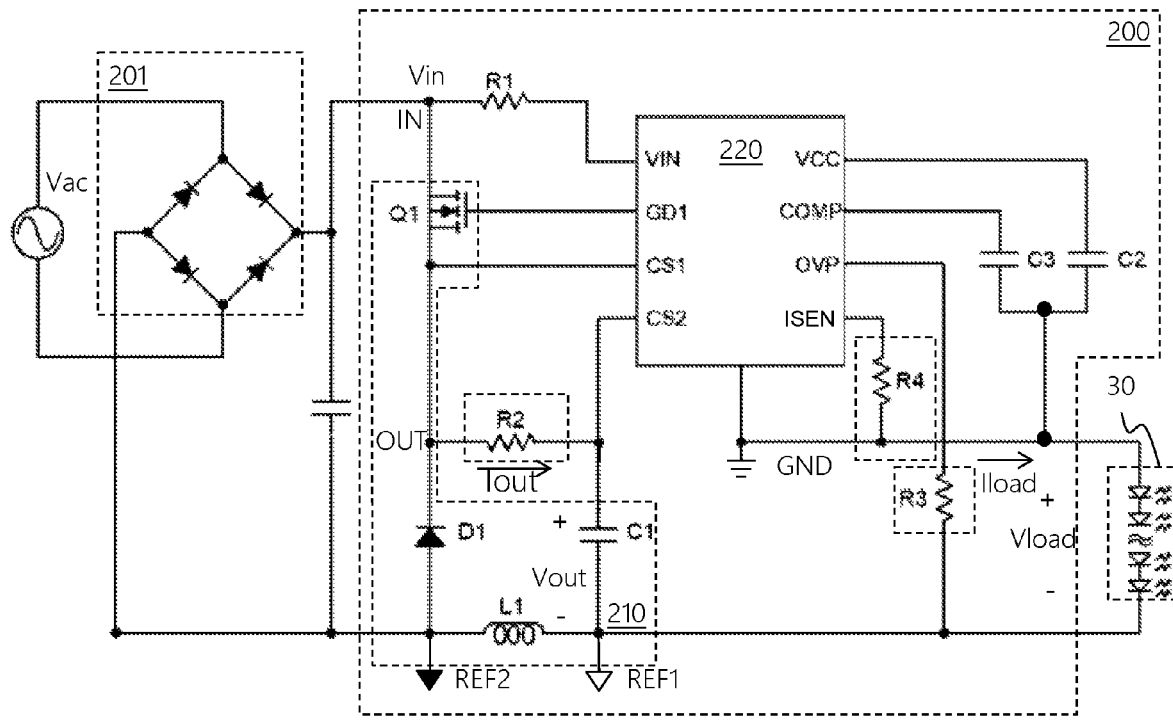
FIG. 7 shows a fifth embodiment of the present invention.

FIG. 7 shows a fifth embodiment according to the present invention. As shown in FIG. 7, the rectifier circuit 201 rectifies the AC voltage Vac to generate the rectified voltage Vin between the input node IN and the ground level GND. The rectifier circuit 201 is for example but not limited to a bridge rectifier circuit as shown in the figure. The switching regulator 200 capable of reducing current ripple includes the buck power stage circuit 210, the control circuit 220, the capacitors C2 and C3, and the resistors R2, R3, and R4. This embodiment is different from the fourth embodiment shown in FIG. 6 in that, in this embodiment, the operation signal generation circuit 221 and the current source circuit 223 for reducing current ripple are integrated to one single integrated circuit (IC) chip. Therefore, the resistors R5 and R6 shown in FIG. 6 can be omitted. The operation signal generation circuit 221 and the current source circuit 223 can be integrated into one single IC chip because the inductor L1 of the buck power stage circuit 210 is arranged between the first reference node REF1 and the second reference node REF2 according to the present invention.

Figure 8:
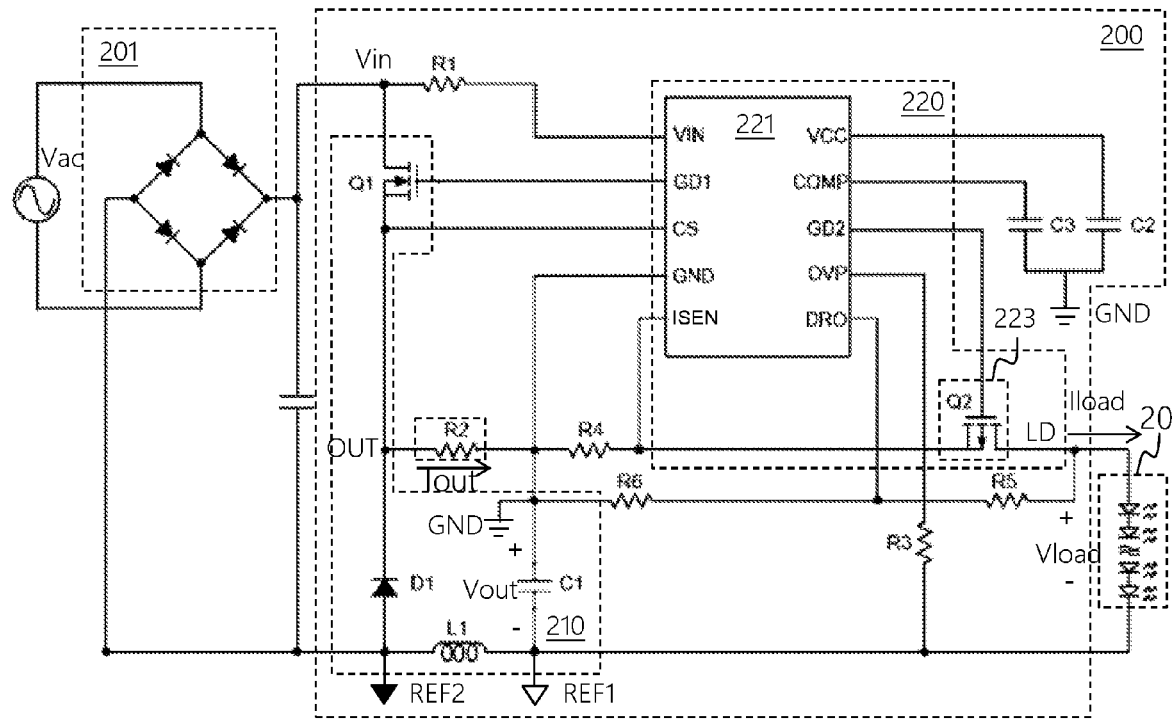
FIG. 8 shows a sixth embodiment of the present invention.

FIG. 8 show a sixth embodiment of the present invention. As shown in FIG. 8, the rectifier circuit 201 rectifies the AC voltage Vac to generate the rectified voltage Vin between the input node IN and the ground level GND. The rectifier circuit 201 is for example but not limited to a bridge rectifier circuit as shown in the figure. The switching regulator 200 capable of reducing current ripple includes the buck power stage circuit 210, the control circuit 220, capacitors C2 and C3, and resistors R1, R2, R3, R4, R5, and R6. The control circuit 220 includes the operation signal generation circuit 221 and the current source circuit 223 for reducing current ripple. The buck power stage circuit 210 operates the power switch Q1 therein according to the operation signal GD1, so as to convert the rectified voltage Vin to the output voltage Vout between the output node OUT and the first reference node REF1 (wherein the voltage drop across the resistor R2 may be ignored), and to generate the output current Iout. The operation signal generation circuit 221 is coupled to the buck power stage circuit 210. The operation signal generation circuit 221 generates the operation signal GD1 according to the current sense signal CSA. The current sense signal CSA is related to the output current Iout. As shown in the figure, for example, the current sense signal CSA may be generated by sensing a voltage drop between the pins CS1 and CS2, which indicates the output current Iout flowing through the resistor R2. The operation signal generation circuit 221 also generates the operation signal GD2 according to the current sense signal CSB. The current sense signal CSB is related to the load current Iload. For example, as shown in the figure, the current sense signal CSB may be generated by electrically connecting the pin ISEN to the resistor R4. The current source circuit 223 for reducing current ripple is coupled to the operation signal generation circuit 221 and the buck power stage circuit 210. The current source circuit 223 includes a ripple reduction switch Q2 which operates according to the operation signal GD2, to convert the output voltage Vout to the load voltage Vload between the load node LD and the first reference node REF1, and to reduce the current ripple of the output current Iout, so as to generate the stable load current Iload which is supplied to the load circuit 50. The load circuit 50 is coupled between the load node LD and the first reference node REF1, and the current source circuit 223 is coupled between the output node OUT and the load node LD. In addition, the resistors R5 and R6 form a voltage divider circuit. The divided voltage at the node between the resistors R5 and R6 is inputted to the pin DRO. This is to obtain information of the drain voltage of the ripple reduction switch Q2. As such, when the ripple reduction switch Q2 is located outside the IC chip which includes the operation signal generation circuit 221, the operation point of the ripple reduction switch Q2 may be adjusted by adjusting the resistances of the resistors R5 and R6.

The current source circuit 223 for reducing current ripple is coupled to the operation signal generation circuit 221 and the buck power stage circuit 210, and the current source circuit 223 operates the ripple reduction switch Q2 therein according to the operation signal GD2, to convert the output voltage Vout to the load voltage Vload between the load node LD and the first reference node REF1, and to reduce the current ripple of the output current Iout, so as to generate a stable load current Iload which is supplied to the load circuit 50, wherein the load circuit 50 in this embodiment is for example but not limited to the LED circuit 20. The LED circuit 20 is coupled between the load node LD and the first reference node REF1, and the current source circuit 223 is coupled between the output node OUT and the load node LD.

Note that, different from the fourth embodiment shown in FIG. 6, in this embodiment, the current source circuit 223 includes a P-type metal oxide semiconductor (MOS) device, instead of an N-type MOS device as shown in FIG. 6. Therefore, a reverse terminal of the LED circuit 20 may be electrically connected to the ground level GND directly.

Figure 9:
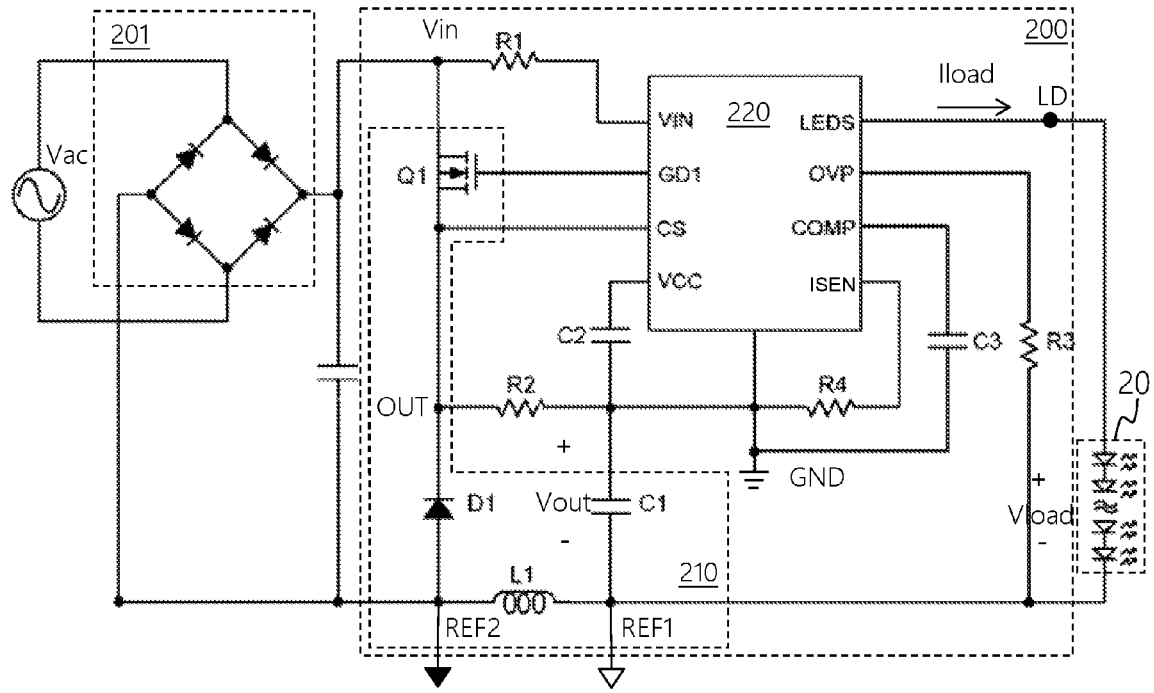
FIG. 9 shows a seventh embodiment of the present invention.

FIG. 9 shows a seventh embodiment according to the present invention. As shown in FIG. 9, the rectifier circuit 201 rectifies the AC voltage Vac to generate the rectified voltage Vin between the input node IN and the ground level GND. The rectifier circuit 201 is for example but not limited to a bridge rectifier circuit as shown in the figure. The switching regulator 200 capable of reducing current ripple includes the buck power stage circuit 210, the control circuit 220, the capacitors C2 and C3, and the resistors R2, R3, and R4. This embodiment is different from the sixth embodiment shown in FIG. 8 in that, in this embodiment, the operation signal generation circuit 221 and the current source circuit 223 for reducing current ripple are integrated into one single IC chip, and the P-type MOS device (not shown) is also integrated in the IC chip, between the pins ISEN and LEDS. The operation signal generation circuit 221 and the current source circuit 223 can be integrated to the IC chip because the inductor L1 of the buck power stage circuit 210 is arranged between the first reference node REF1 and the second reference node REF2 according to the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. For another example, when a circuit retrieves an external signal into the circuit (for example but not limited to the current sense signal CSA sensed by the operation signal generation circuit), the signal may be subject to a voltage-to-current conversion, a current-to-voltage conversion, or a ratio conversion, etc. before it is processed by the circuit, and therefore, "performing an operation according to a certain signal" in the present invention, is not limited to performing an operation according to the signal itself, but can be performing an operation according to a signal which is converted from the signal. For another example, it is not limited for each of the embodiments described hereinbefore to be used alone; under the spirit of the present invention, two or more of the embodiments described hereinbefore can be used in combination. For example, two or more of the embodiments can be used together, or, apart of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:
1. A switching regulator, comprising:
a buck power stage circuit, which is configured to operably control at least one power switch therein according to a first operation signal, so as to convert a rectified voltage to an output voltage between an output node and a first reference node, and to generate an output current; and
a control circuit, including:
an operation signal generation circuit, which is coupled to the buck power stage circuit, the operation signal generation circuit being configured to operably generate the first operation signal according to a first current sense signal or a voltage sense signal, wherein the first current sense signal is related to the output current, and the voltage sense signal is related to the output voltage, and the operation signal generation circuit being configured to operably generate a second operation signal according to a second current sense signal; and
a current source circuit for reducing current ripple, which is coupled to the operation signal generation circuit and the buck power stage circuit, and is configured to operably control a ripple reduction switch therein according to the second operation signal, to convert the output voltage to a load voltage between a load node and the first reference node, and to reduce a current ripple of the output current, so as to generate a load current for supplying to a load circuit;
wherein the load circuit is coupled between the load node and the first reference node, and the current source circuit is coupled between the output node and the load node, wherein the second current sense signal is related to the load current.
2. The switching regulator of claim 1, wherein the buck power stage circuit includes:
the power switch, which is coupled between the operation signal generation circuit and the output node, and is configured to operably control according to the first operation signal, so as to convert the rectified voltage to the output voltage between the output node and the first reference node, and to generate the output current;
a diode or a switch, which is coupled between the output node and a second reference node, wherein the diode has a forward terminal and a reverse terminal, wherein the reverse terminal is electrically connected to the output node, and the forward terminal is electrically connected to the second reference node; and
an inductor, which is coupled between the first reference node and the second reference node.

3. The switching regulator of claim 1, wherein the buck power stage circuit further includes a first capacitor, which is coupled between the output node and the first reference node.

4. The switching regulator of claim 1, wherein the operation signal generation circuit and the current source circuit are integrated in an integrated circuit (IC) chip.

5. The switching regulator of claim 1, wherein the operation signal generation circuit generates the first operation signal according to voltage sense signal, so as to regulate the output voltage, and generates the second operation signal according to the second current sense signal, such that the current source circuit regulates the load current.

6. The switching regulator of claim 1, further comprising a first current sense circuit, which is coupled between the output node and the load node, and is configured to operably generate the first current sense signal according to the output current.

7. The switching regulator of claim 1, further comprising an over voltage protection (OVP) detection circuit, which is coupled between the operation signal generation circuit and the first reference node, and is configured to operably provide an OVP signal to the operation signal generation circuit, wherein the operation signal generation circuit generates the first operation signal further according to the OVP signal, so as to trigger an OVP procedure when the OVP signal exceeds an over voltage threshold.

8. The switching regulator of claim 6, wherein the operation signal generation circuit triggers an over current protection (OCP) procedure when the first current sense signal exceeds an over current threshold.

9. The switching regulator of claim 1, wherein the load circuit includes a light emitting device circuit.

10. The switching regulator of claim 1, wherein the operation signal generation circuit generates the first operation signal according to the first current sense signal, so as to regulate the output current, and generates the second operation signal according to a ripple signal of the second current sense signal, such that the current source circuit reduces the current ripple.

11. A control circuit of a switching regulator, wherein the switching regulator includes a buck power stage circuit, which is configured to operably control at least one power switch therein according to a first operation signal, so as to convert a rectified voltage to an output voltage between an output node and a first reference node, and to generate an output current; the control circuit comprising:

an operation signal generation circuit, which is coupled to the buck power stage circuit, the operation signal generation circuit being configured to operably generate the first operation signal according to a first current sense signal or a voltage sense signal, wherein the first current sense signal is related to the output current, and the voltage sense signal is related to the output voltage, and the operation signal generation circuit being configured to operably generate a second operation signal according to a second current sense signal; and a current source circuit for reducing current ripple, which is coupled to the operation signal generation circuit and the buck power stage circuit, and is configured to operably control a ripple reduction switch therein according to the second operation signal, to convert the output voltage to a load voltage between a load node and the first reference node, and to reduce a current ripple of the output current, so as to generate a load current for supplying to a load circuit;

wherein the load circuit is coupled between the load node and the first reference node, and the current source circuit is coupled between the output node and the load node, wherein the second current sense signal is related to the load current.

12. The control circuit of claim 11, wherein the buck power supply circuit includes:

the power switch, which is coupled between the operation signal generation circuit and the output node, and is configured to operably control according to the first operation signal, so as to convert the rectified voltage to the output voltage between the output node and the first reference node, and to generate the output current;

a diode or a switch, which is coupled between the output node and a second reference node, wherein the diode has a forward terminal and a reverse terminal, wherein the reverse terminal is electrically connected to the output node, and the forward terminal is electrically connected to the second reference node; and an inductor, which is coupled between the first reference node and the second reference node.

13. The control circuit of claim 11, wherein the buck power stage circuit further includes a first capacitor, which is coupled between the output node and the first reference node.

14. The control circuit of claim 11, wherein the operation signal generation circuit and the current source circuit are integrated in an integrated circuit (IC) chip.

15. The control circuit of claim 11, wherein the operation signal generation circuit generates the first operation signal according to voltage sense signal, so as to regulate the output voltage, and generates the second operation signal according to the second current sense signal, such that the current source circuit regulates the load current.

16. The control circuit of claim 11, wherein the switching regulator further includes a first current sense circuit, which is coupled between the output node and the load node, and which is configured to operably generate the first current sense signal according to the output current.

17. The control circuit of claim 11, wherein the switching regulator further includes an over voltage protection (OVP) detection circuit, which is coupled between the operation signal generation circuit and the first reference node, and which is configured to operably provide an OVP signal to the operation signal generation circuit, wherein the operation signal generation circuit generates the first operation signal further according to the OVP signal, so as to trigger an OVP procedure when the OVP signal exceeds an over voltage threshold.

18. The control circuit of claim 16, wherein the operation signal generation circuit triggers an over current protection (OCP) procedure when the first current sense signal exceeds an over current threshold.

19. The control circuit of claim 11, wherein the load circuit includes a light emitting device circuit.

20. The control circuit of claim 11, wherein the operation signal generation circuit generates the first operation signal according to the first current sense signal, so as to regulate the output current, and generates the second operation signal according to a ripple signal of the second current sense signal, such that the current source circuit reduces the current ripple.

* * * * *